（12) United States Patent
Yang

(10) Patent No.: US 12,182,342 B2
(45) Date of Patent: Dec. 31, 2024

(54) METHOD AND USER TERMINAL FOR DISPLAYING EMOTICONS USING CUSTOM KEYWORD

(71) Applicant: KAKAO CORP., Jeju-si (KR)

(72) Inventor: Jee Min Yang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/847,905

(22) Filed: Jun. 23, 2022

(65) Prior Publication Data

US 2022/0413625 A1    Dec. 29, 2022

(30) Foreign Application Priority Data

Jun. 25, 2021  (KR) .......................... 10-2021-0083286

(51) Int. Cl.
*G06F 3/023* (2006.01)
*G06F 3/04817* (2022.01)
*G06F 3/04842* (2022.01)

(52) U.S. Cl.
CPC .......... *G06F 3/0237* (2013.01); *G06F 3/0236* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 2010/0125811 A1* | 5/2010 | Moore | H04M 1/7243 715/846 |
| 2011/0296324 A1* | 12/2011 | Goossens | G06Q 50/01 715/763 |
| 2015/0379336 A1* | 12/2015 | Hoshi | G06V 30/1456 382/187 |
| 2016/0210116 A1* | 7/2016 | Kim | G06F 40/274 |
| 2016/0210963 A1* | 7/2016 | Kim | G10L 15/1822 |
| 2017/0083174 A1* | 3/2017 | Tobens, III | G06F 3/0485 |
| 2017/0083586 A1* | 3/2017 | Huang | G06F 16/532 |
| 2017/0300462 A1* | 10/2017 | Cudworth | G06F 40/274 |
| 2017/0308290 A1* | 10/2017 | Patel | G06F 3/04817 |
| 2018/0356957 A1* | 12/2018 | Desjardins | G06F 40/274 |
| 2019/0007352 A1* | 1/2019 | Doh | H04L 51/04 |
| 2019/0294259 A1* | 9/2019 | Liu | H04L 51/10 |
| 2021/0326390 A1* | 10/2021 | Aher | G06F 40/30 |

(Continued)

FOREIGN PATENT DOCUMENTS

| | | |
|---|---|---|
| JP | 2009-521018 A | 5/2009 |
| KR | 2014-0035160 A | 3/2014 |

(Continued)

*Primary Examiner* — Linda Huynh
(74) *Attorney, Agent, or Firm* — NKL LAW; Jae Youn Kim

(57) ABSTRACT

Provided is a method for recommending emoticons using a custom keyword, the method including: receiving, by a user terminal, matching information in which a custom keyword is matched with at least one metadata, wherein the metadata is information on attributes of an emoticon; storing the matching information or transmitting the matching information to a server by the user terminal; receiving, by the user terminal, the custom keyword through a message input window; and displaying, by the user terminal, at least one emoticon related to the metadata.

18 Claims, 18 Drawing Sheets

(56) References Cited

U.S. PATENT DOCUMENTS

2021/0374342 A1\* 12/2021 Kim ...................... G06F 16/903
2022/0334652 A1\* 10/2022 Bayer ..................... G06F 40/40

FOREIGN PATENT DOCUMENTS

| KR | 2017-0074140 A | 6/2017 | | |
|---|---|---|---|---|
| KR | 10-2018-0080987 A | 7/2018 | | |
| KR | 1020180080986 A | 7/2018 | | |
| KR | 2020-0021663 A | 3/2020 | | |
| WO | WO-2016148525 A1 * | 9/2016 | ............ | G06F 16/00 |
| WO | 2020223339 A1 | 11/2020 | | |

\* cited by examiner

| | A | B | C | D |
|---|---|---|---|---|
| Field |  |  |  |  |
| KEYWORD | Okay/Yes/OK | Heart/Love | Hungry | Let's eat |
| EMOTION | Positive | Love | - | - |
| CHARACTER | Toshimee | JAY-G | Muzi | - |
| CASUAL LEVEL | C | B | A | A |
| PREFERENCE BY AGE | 30's | 20's | 30's | 30's |
| PREFERENCE BY GENDER | Female | Male | Female | Male |
| FAVORITE | YES | NO | YES | NO |
| RECENTLY USED | NO | YES | YES | NO |

| Custom Keyword | Metadata | |
|---|---|---|
| | Field | Contents |
| h u n | Keyword | Hungry |
| f a v | Favorite | Yes |
| r u | Recently used | Yes |

| Custom Keyword | Metadata ||
| --- | --- | --- |
| | Field | Contents |
| h u n | Keyword | Hungry |
| | Keyword | Let's eat |
| jg | Character | JAY-G |
| | Keyword | Hip-hop |

FIG. 11

| Additional Custom Keyword | Custom Keyword | Metadata ||
| :---: | :---: | :---: | :---: |
| | | Field | Contents |
| j a y | jg | Character | JAY-G |
| | | Keyword | Hip-hop |

FIG. 16

METHOD AND USER TERMINAL FOR DISPLAYING EMOTICONS USING CUSTOM KEYWORD

CROSS-REFERENCE TO RELATED PATENT APPLICATIONS

This application claims the benefit of Korean Patent Application No. 10-2021-0083286, filed in the Korean Intellectual Property Office on Jun. 25, 2021, the entire contents of which is incorporated herein by reference.

BACKGROUND OF THE DISCLOSURE

Field of the Disclosure

The present disclosure relates to a method and a user terminal for displaying emoticons using a custom keyword, and more particularly, to a method in which a user terminal displays emoticons related to a custom keyword in an instant message service.

Related Art

Due to the improvement of wireless communication technologies and the widespread of smart phones, information transmitted and received in instant message services is expanding from text information to various types of multimedia information. In the multimedia information, emoticons are more and more used because they can easily show a user's emotion in fun ways.

Whereas the past instant message services provide a limited number of emoticons capable of expressing some typical emotions, an instant message service for providing more than tens of thousands of emoticons related to various types of emotion and topics has been introduced recently. Therefore, emoticons are being used to express not just a user's emotion in fun ways but also the user's individual personality.

As the number of provided emoticons increases, a function for allowing a user to easily find and use a desired emoticon has been becoming important. To this end, a recent instant message service provides a function to assign keywords to emoticons and search for an emoticon using a keyword input by a user. However, since users may associate different keywords with a specific emoticon, it is not possible to assign a keyword that reflects the needs or taste of every user.

Therefore, there is an increasing demand for a method for allowing a user to find and use a desired emoticon in a simpler and faster way.

RELATED DOCUMENT

Patent Document (Patent Document 1) Korea Patent Application Publication No. 10-2018-0080987 (Published on Jul. 13, 2018)

SUMMARY OF THE DISCLOSURE

An objective of the present disclosure is to provide a method for allowing a user to easily find and use an emoticon using a custom keyword set by the user.

Another object of the present disclosure is to provide a method for allowing a user to easily find and use an emoticon by matching a custom keyword with metadata on any of various attributes of the emoticon.

In an aspect, there is provided a method for recommending emoticons using a custom keyword, the method including: receiving, by a user terminal, matching information in which a custom keyword is matched with at least one metadata, wherein the metadata is information on attributes of an emoticon; storing the matching information or transmitting the matching information to a server by the user terminal; receiving, by the user terminal, the custom keyword through a message input window; and displaying, by the user terminal, at least one emoticon related to the metadata.

The at least one metadata may be a plurality of metadata, and in the displaying of the emoticon, the user terminal may categorize and display the at least one emoticon into groups by related metadata.

The receiving of the matching information may include: receiving the custom keyword by the user terminal; displaying the at least one metadata by the user terminal; and receiving, by the user terminal, an interaction of selecting at least a piece of the at least one metadata from a user.

In the displaying the emoticon, the user terminal may display with a highest priority or selectively an emoticon related to the metadata selected by the interaction.

Each metadata may be designated with a field indicating information regarding which attribute among a plurality of attributes the emoticons relates to, and in the displaying of the metadata, the user terminal may display the field of the metadata together.

Each metadata may be designated with a field indicating information regarding which attribute among a plurality of attributes an emoticon relates to, and the at least one metadata may be multiple metadata, and at least a piece of the multiple metadata are metadata designated with different fields.

The metadata may indicate whether the emoticon is an emoticon classified as the user's favorite or an emoticon classified as being recently used.

The method may, prior to the receiving of the matching information, further includes receiving information on the custom keyword and the metadata by the user terminal.

When the custom keyword is identical to a pre-registered search keyword used to search for emoticons, the user terminal may display a search result, which is found using the custom keyword, as a search keyword in the displaying of the emoticon.

The method may, when the custom keyword is identical to a pre-registered search keyword used to search for emoticons, further include providing an interface for determining whether to display at least one emoticon related to the metadata later or whether to display a search result, which is found using the custom keyword, as a search keyword together by the user terminal.

The method may further include: receiving, by the user terminal, additional matching information in which an additional custom keyword is matched with the custom keyword; and storing the additional matching information or transmitting to a server by the user terminal.

The method may further include receiving, by the user terminal, an interaction of selecting a part of at least one emoticon related to the metadata, and in the displaying of the emoticon, the user terminal may display with a highest priority or selectively an emoticon selected by the interaction.

In the displaying of the emoticon, the user terminal may display at least one emoticon related to the metadata in an order determined in consideration of the user's emoticon use history or emoticon preference information.

In another aspect, there is provided a user terminal including: a memory; a processor connected to the memory and configured to execute instructions stored in the memory; an input part configured to receive information under control of the processor; an output part configured to output information under control of the processor; and a communication part configured to transmit information to an outside under control of the processor, wherein the processor is further configured to: receive matching information in which a custom keyword and at least one metadata are input through the input part, wherein the metadata is information on attributes of an emoticon; store the matching information in the memory or transmit the matching information to the server through the communication part; receive the custom keyword input through the input part; and display at least one emoticon related to the metadata.

In another aspect, there is provided a method for providing emoticons using a custom keyword, the method including: receiving, by a server, matching information in which the custom keyword and at least one metadata are matched from a user terminal, wherein the metadata is information on attributes of an emoticon; receiving, by the server, a request from the user terminal to provide information on at least one emoticon for the custom keyword; selecting, by the server, at least one emoticon related to the metadata; and providing, by the server, information on the at least one emoticon to the user terminal.

In the method for displaying an emoticon using a custom keyword according to the present disclosure, it is possible to easily find and use an emoticon using a custom keyword set by a user.

In addition, in the method for displaying an emoticon using a custom keyword according to the present disclosure, it is possible for a user to easily find and use the emoticon by matching a custom keyword with metadata on any of various types of attributes of the emoticon.

BRIEF DESCRIPTION OF THE DRAWINGS

FIG. 11 is a table illustrating an example of matching information in which a custom keyword and metadata are matched.

FIG. 16 is a table illustrating an example of matching information in which a custom keyword and metadata are matched.

DESCRIPTION OF EXEMPLARY EMBODIMENTS

Figure 1:
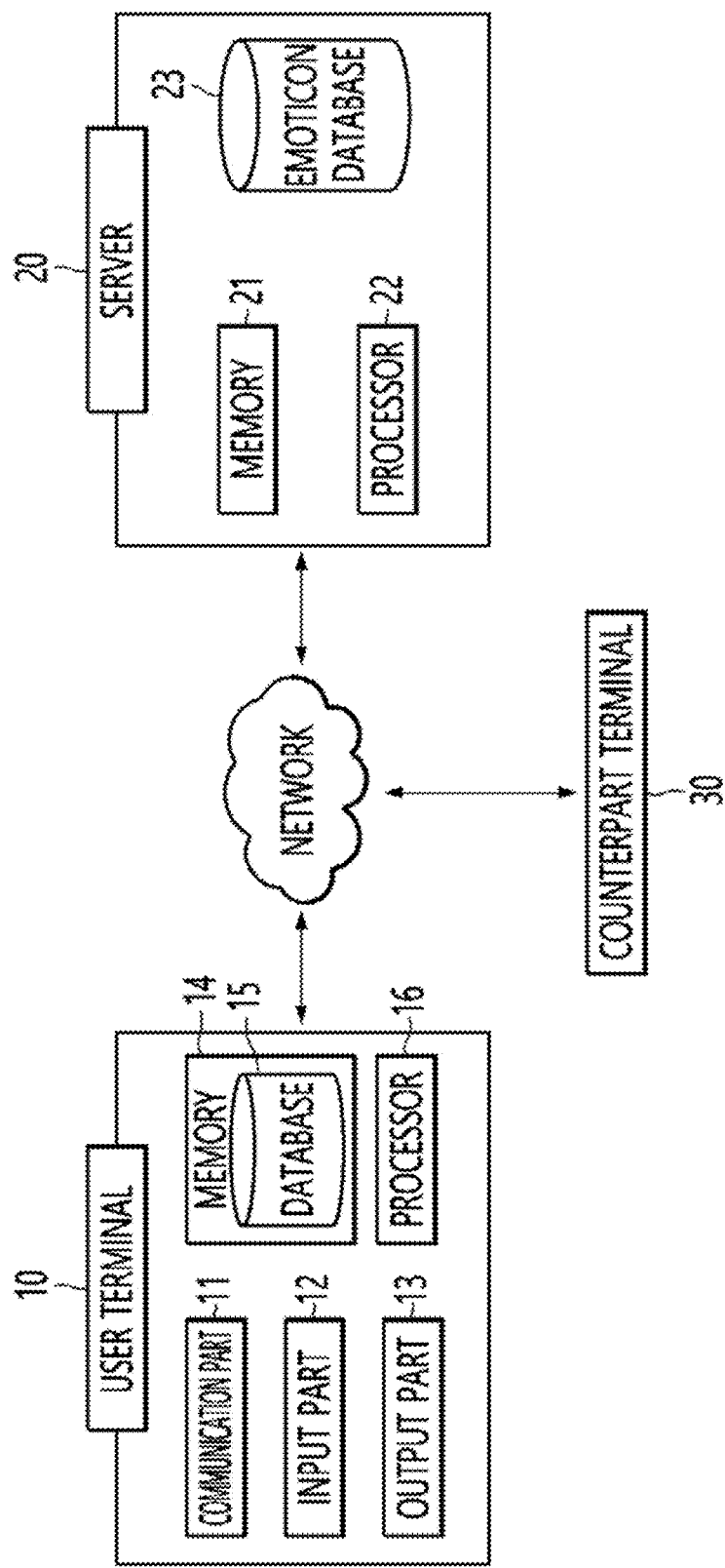
FIG. 1 is a diagram illustrating an example of a network environment according to an embodiment of the present disclosure.

Hereinafter, the embodiments disclosed in the present specification will be described in detail with reference to the accompanying drawings, but the same or similar components are assigned the same reference numbers regardless of reference numerals, and redundant description thereof will be omitted. In addition, in describing the embodiments disclosed in the present specification, if it is determined that detailed descriptions of related known technologies may obscure the gist of the embodiments disclosed in this specification, the detailed description thereof will be omitted.

Terms including an ordinal number such as 1st, 2nd, etc. may be used to describe various elements, but the elements are not limited by the terms. The above terms are used only for the purpose of distinguishing one component from another.

The singular expression includes the plural expression unless the context clearly dictates otherwise.

In the present application, each of the steps described may be performed regardless of the listed order, except for a case where they must be performed in the listed order due to a special causal relationship.

In the present application, terms such as "comprises" or "have" are intended to designate that a feature, number, step, operation, component, part, or combination thereof described in the specification exists, but one or more other features It should be understood that this does not preclude the existence or addition of numbers, steps, operations, components, parts, or combinations thereof.

Hereinafter, the present disclosure will be described with reference to the accompanying drawings.

FIG. 1 is a diagram illustrating an example of a network environment according to an embodiment of the present disclosure.

The network environment according to an embodiment of the present disclosure shown in FIG. 1 may include a user terminal 10, a server 20, and a counterpart terminal 30.

A communication method is not limited in a network, and not only a communication method using a communication network (e.g., a mobile communication network, a wired Internet, a wireless Internet, a broadcasting network) that the network could include, but also short-range wireless communication may be included.

The user terminal 10 may be a fixed terminal implemented as a computer device or a mobile terminal. For example, the user terminal 10 may include a smart phone, a mobile phone, a tablet PC, a computer, a notebook computer, a personal digital assistant (PDA), and the like. For example, the user terminal 10 may communicate with the server 20 via a network using a wireless or wired communication method.

The user terminal 10 may be used by a user. The user may be a user of the user terminal 10 or may refer to an account registered as a user in an instant message service provided by the server 20. Accordingly, the fact that the server 20 transmits certain information to a user may mean that the information is transmitted to the user terminal 10 through the user's account registered in the server 20.

The user terminal 10 may include a communication part 11, an input part 12, an output part 13, a memory 14, and a processor 15.

The communication part 11 may communicate with the server 20 or another terminal 30 in a wired/wireless manner.

The input part 12 may receive various types of information according to the user's manipulation and input action. The input part 12 may be a touch screen module, a keyboard, a mouse, a button, a camera, a stylus, a microphone, and the like.

The user terminal 10 may receive the user's interaction through the input part 12. The Interaction means that the user manipulates the input part 12 to input information reflecting the user's selection or intention into the user terminal 10.

The output part 13 may output various types of information. The output part 13 may be a display device, a speaker, a vibration generating device, a tactile sense generating device, or the like. In some cases, the output part 13 may be a device (e.g., Bluetooth earphone) connected to the user terminal through wired/wireless communication (e.g., short-range wireless communication such as Bluetooth) to receive and output a signal.

The memory 14 functions as a storage medium and may store a plurality of application programs driven in the user terminal 10, and data and instructions for operation of the user terminal 10. In terms of hardware, the memory 14 may be provided in the form of any of various storage devices such as ROM, RAM, flash drive, hard drive, or the like, or may be provided in the form of web storage.

In an embodiment, an application related to an instant message service and an application related to a method for recommending emoticons may be stored in the memory 14.

In addition, emoticon information may be stored in the memory 14. The emoticon information may include image information on an emoticon, graphic information on the emoticon, and metadata which is information on attributes of the emoticon.

In addition, the memory 14 may include a database 15 in which matching information for a keyword is stored. The matching information for the custom keyword is information indicating that the custom keyword is matched with at least one metadata. Metadata refers to information on attributes of an emoticon. The database 15 will be described in more detail later.

The processor 16 controls the overall operation of the communication part 11, the input part 12, the output part 13, and the memory 14 to execute an application related to an instant message service and an application related to a method for displaying an emoticon using a custom keyword.

The server 20 may be implemented as a computer device or a plurality of computer devices that communicates with the user terminal 10 via a network to provide commands, codes, files, contents, services, and the like.

The server 20 may include an emoticon database 23 or may be connected to the emoticon database 23 via a network. The emoticon database 23 may include emoticon information that can be downloaded to the user terminal 10. The emoticon information may include image information on an emoticon, graphic information on the emoticon, and metadata related to the emoticon. Here, the emoticon information may be stored in at least one of the memory 14 of the user terminal 10 and the emoticon database 23 of the server 20. In some cases, matching information received from the user terminal 10 may be stored in the emoticon database 23 of the server 20.

The counterpart terminal 30 is similar to the user terminal 10 described above. Therefore, among characteristics of the counterpart terminal 30, differences thereof from the user terminal will be mainly described.

The counterpart terminal 30 may be used by the user's chat counterpart. The counterpart may refer to an account registered as another user registered in the instant message service provided by the server 20. The user terminal 10 and the counterpart terminal 30 may transmit and receive information to and from each other through the server 20 or via a directly connected network.

The user terminal 10 according to the present disclosure may receive information on a custom keyword and metadata from a user. Here, the custom keyword refers to a keyword directly set by the user to search for or retrieve an emoticon. The user may use any word as a custom keyword depending on his or her preferences. For example, a user can use a custom keyword that consists only of the initial consonant of a word. In addition, the metadata refers to information on attributes of the emoticons.

The user terminal 10 may receive matching information in which a custom keyword and metadata are matched. The user terminal 10 may store the matching information in the memory 14 of the user terminal 10 or transmit the same to the server 20.

Thereafter, the user terminal 10 may receive a custom keyword input from the user through a message input window. The user terminal 10 may display emoticons related to metadata matched with a custom keyword in response to the user's input of the custom keyword.

Thereafter, the user terminal 10 may receive an interaction of selecting any one of the displayed emoticons from the user. In response, the user terminal 10 may transmit an emoticon selected by the user to the server 20, so that the emoticon can be transmitted to the counterpart terminal 30. In addition, the user terminal 10 may display the emoticon selected by the user on a chat room screen.

In doing so, the user may be able to find and use an emoticon using a custom keyword set by himself or herself. In particular, by setting custom keywords to be simpler or shorter than existing search keywords, it is possible for the user to search for and find a desired emoticon more quickly. In addition, by matching multiple metadata to one custom keyword, it is possible for the user to create his or her own combination of emoticons for one keyword.

Before describing a method for recommending emoticons according to the present disclosure, emoticons and metadata will be described.

Figure 2:
FIG. 2 is a summary of emoticons and metadata related thereto according to an embodiment of the present disclosure.
Figure 2:
Figure 2:
Figure 2:

FIG. 2 is a summary of emoticons and metadata related thereto according to an embodiment of the present disclosure.

One emoticon may have metadata related thereto. Here, the metadata of the emoticon refers to information on attributes of the corresponding emoticon. One emoticon may have multiple metadata. In each metadata, a field indicating information on which one among a plurality of attributes of an emoticon may be designated.

As shown in FIG. 2, a plurality of fields may indicate classification by keyword, emotion, character, casual level, preference by age group, preference by gender, favorite, and whether a corresponding emoticon has been recently used. In addition, one or more metadata may be stored as contents of metadata of each field. In some cases, a certain emoticon may not have metadata in a certain field.

Metadata in a keyword field may be information that a user searches to use a corresponding emoticon. For example, as shown in FIG. 2, the "Okay" emoticon in column A may be an emoticon provided when the user searches for the keywords "Okay", "Yes", or "OK".

Metadata in an emotion field may be information on emotion that an emoticon means For example, the emoticon in column B of FIG. 2 may be an emoticon related to the emotion of "love". In addition, as in the case of the emoticons in columns C and D of FIG. 2, no contents may be input to metadata of the emotion field.

In addition, metadata in a character field may be information on a character when an emoticon includes a specific character. For example, since the emoticon in column B of FIG. 2 is an emoticon for the character "JAY-G", it can be seen that metadata of the character field is "JAY-G".

In addition, metadata in the casual level field may be information regarding whether an environment or context where an emoticon is used is appropriate to be casual and light or appropriate to be formal and strict For example, the "Let's eat" emoticon in column D of FIG. 2 has the casual level of A, so it may be appropriate to use the "Let's eat" emoticon in a relatively casual atmosphere, and the "Okay" emoticon in column A of FIG. 2 has the casual level C, so it may be appropriate to use the may be appropriate to use the "Okay" emoticon in a formal and strict atmosphere.

In addition, in the fields of the metadata, there may be a field indicating which user prefers to use a corresponding emoticon, such as preference by age group and preference by gender. When displaying a plurality of emoticons using such metadata, it is possible to determine a priority in arrangement.

In addition, in the field of the metadata, there may be a field reflecting the user's use history. Specifically, information on whether a corresponding emoticon is an emoticon classified as the user's favorite and information on whether the corresponding emoticon is an emoticon classified as being recently used may be stored as separate fields of the metadata. A description of the specific criteria for how to classify as a favorite and how to classify as being recently used will be omitted.

The above-described fields are merely exemplary, and in addition to the above-described fields, various fields such as an artist, series type, style, color, and size may be added as metadata.

Hereinafter, an embodiment of a method in which the user terminal 10 according to the present disclosure displays emoticons using a custom keyword will be described with reference to FIGS. 3 to 8.

Figures 3, 4:
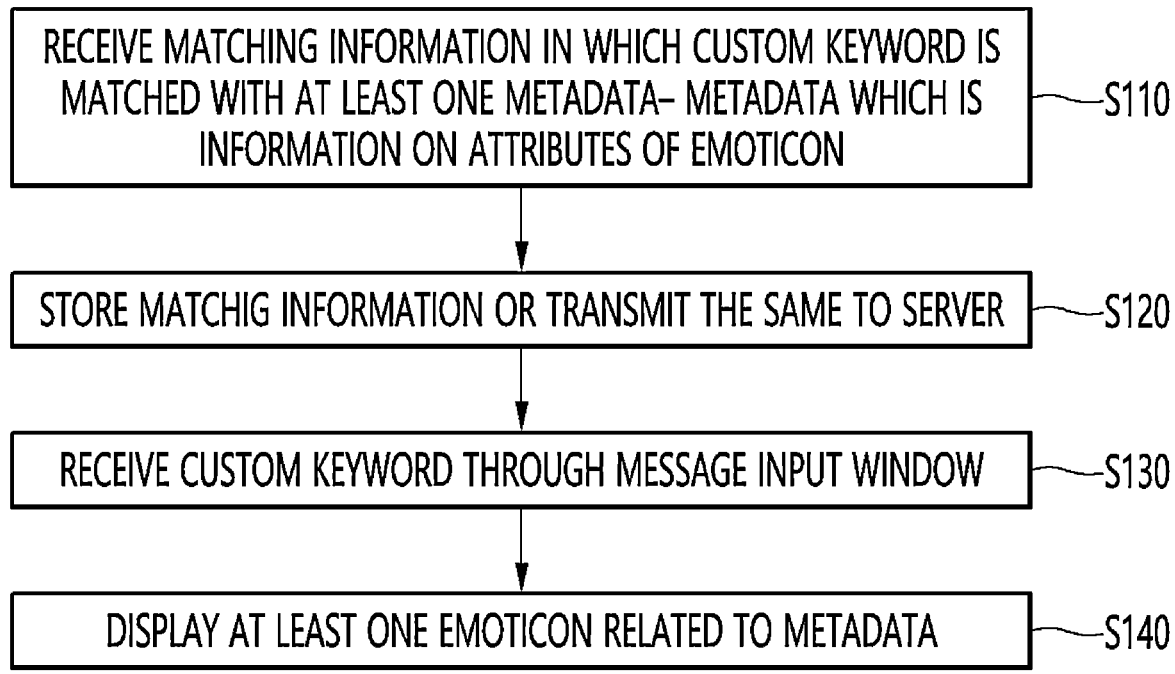
FIG. 3 is a flowchart of an embodiment of a method in which a user terminal displays emoticons using a custom keyword.
FIG. 4 is a table illustrating an example of matching information in which custom keywords and metadata are matched.

FIG. 3 is a flowchart of an embodiment of a method for displaying an emoticon using a custom keyword.

In operation S110, a user terminal 10 receives matching information in which a custom keyword and at least one metadata are matched. Here, the metadata is information on properties attributes of an emoticon.

To this end, the user terminal 10 may receive information on a custom keyword and metadata from the user before the operation S110.

As an example, the user terminal 10 may first receive a custom keyword input from the user. In addition, metadata to be matched with the input custom keyword may be input. When the user inputs metadata, the user terminal 10 may provide a word pre-stored as metadata for an emoticon to the user through an Autocomplete function. Here, the user terminal 10 may receive one or two or more metadata inputs.

In another example, the user terminal 10 may first display metadata of an emoticon. For example, when the metadata is a search keyword to search for an emoticon, the user terminal 10 may search for the emoticon with the search keyword and then display the search keyword and the emoticon corresponding to the search keyword together. As described above, in a state in which the user terminal 10 first displays the metadata of the emoticon, it is possible to provide a function of inputting a custom keyword matching the displayed metadata. The user may select an interface provided as "Enter custom keyword" or the like, and input a custom keyword matching the corresponding metadata.

In this way, after the user inputs all of the custom keyword and the metadata into the user terminal 10, the user may input an interaction of selecting a button such as "Save custom keyword" or "Match" displayed on the user terminal 10. If so, the user terminal 10 receives matching information in which the corresponding custom keyword and the metadata are matched.

In operation S120, the user terminal 10 may store the matching information in the memory 14 or transmit the same to the server 20. Specifically, the user terminal 10 may store the matching information, received in the operation S110, at a pre-stored location. Here, the pre-stored location may be the database 15 stored in the memory 14 of the user terminal 10 or may be the server 20 in some cases. The server 20 may be an operating server of an instant message service that delivers an emoticon to a counterpart through a message. When the matching information is stored in the memory 14 of the user terminal 10, it is possible to read the matching information more stably and quickly regardless of a network environment when the user uses the custom keyword.

In operation S130, the user terminal 10 receives a custom keyword from the user through a message input window. Specifically, the user terminal 10 may provide the user with a chatting window and a message input window for inputting a message which is to be input through the chatting window. The user may input the custom keyword into the user terminal 10 by an interaction of selecting a message input window and inputting information.

In some cases, the user terminal 10 may check information being input by the user, and when the information being input by the user matches a preset custom keyword, the user terminal 10 may provide an Autocomplete function to provide a matching custom keyword.

In operation S140, the user terminal 10 may display at least one emoticon related to metadata matched with the custom keyword input in the operation S130. To this end, the user terminal 10 may input a custom keyword into the matching information to read information of metadata matched with the custom keyword. Then, the user terminal 10 may display emoticons related to the read metadata. Here, the user terminal 10 may receive the emoticons to be displayed from the server 20 or may read the emoticons to be displayed from the emoticon database 15 stored in the memory 14 and display the same.

In the operation S140, the user terminal 10 may display the emoticons in a predetermined partial area of a chat room. Here, the predetermined partial area may be an area in which a keyboard interface for inputting a message in an original chat room is displayed. In the operation S140, the emoticons may be displayed an overlapping form on the keyboard.

FIG. 4 is a table illustrating an example of matching information in which custom keywords and metadata are matched.

Referring to FIG. 4, a user may match a custom keyword "hun" with metadata "hungry". The matched information may be received by the user terminal 10 as matching information in the operation S110, and may be stored in the memory of the user terminal 10 or transmitted to the server 20 in the operation S120. Here, the metadata "hungry" may be metadata in a keyword field.

Metadata matched with a custom keyword may correspond to any of various fields. As shown in FIG. 4, the metadata may correspond to a keyword field, a favorite field, and a recently used field. Here, the favorite field may indicate whether a corresponding emoticon is an emoticon classified as a user's favorite, and the recently used field may indicate whether a corresponding emoticon is an emoticon classified as being recently used.

Figure 5:
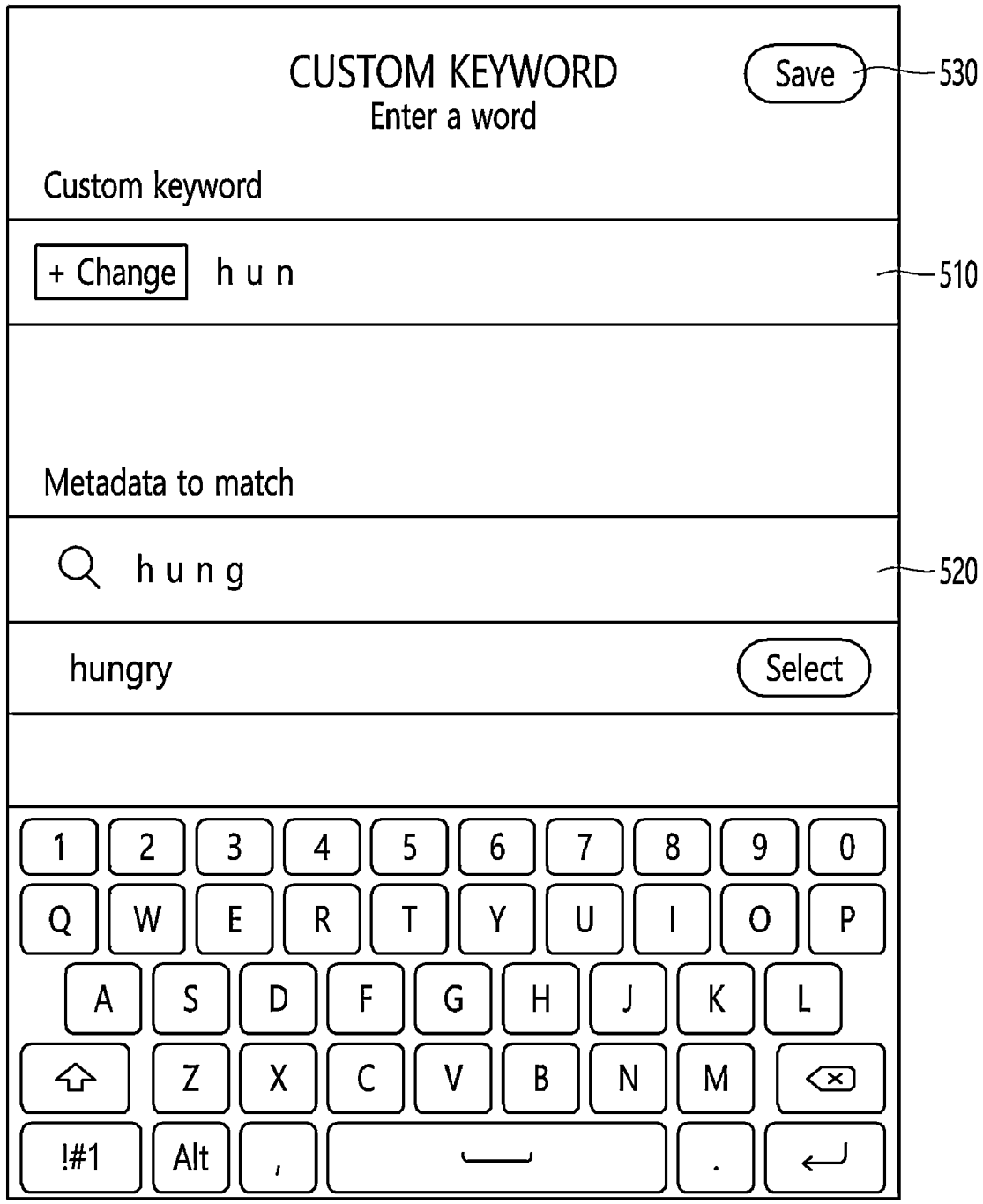
FIG. 5 is a screen illustrating an example in which the user terminal receives matching information in which a custom keyword and metadata are matched.

FIG. 5 is a screen illustrating an example in which the user terminal 10 receives matching information in which a custom keyword and metadata are matched. FIG. 5 shows a case where the matching information shown in FIG. 4 is input.

Before the operation S110 is performed, the user terminal 10 may provide a user with an input window interface 510 for inputting a custom keyword and an input window interface 520 for inputting matching metadata. The user may input a custom keyword and metadata through the provided interfaces 510 and 520.

In some cases, the user terminal 10 may provide an Autocomplete function for metadata. Also, in some cases, the user terminal 10 may recommend appropriate or user-preferred metadata with reference to the input custom keyword.

Referring to FIG. 4, it can be seen that the user enters a custom keyword of "hun" and enters only "hung" in the input window to input metadata, but the metadata "hungry" is displayed through an Autocomplete or recommendation function.

When the user completes inputting of the custom keyword and the metadata and selects a save button 530 provided by the user terminal 10, the user terminal 10 may receive matching information in which the custom keyword "hun" and the metadata "hungry" are matched.

Figure 6:
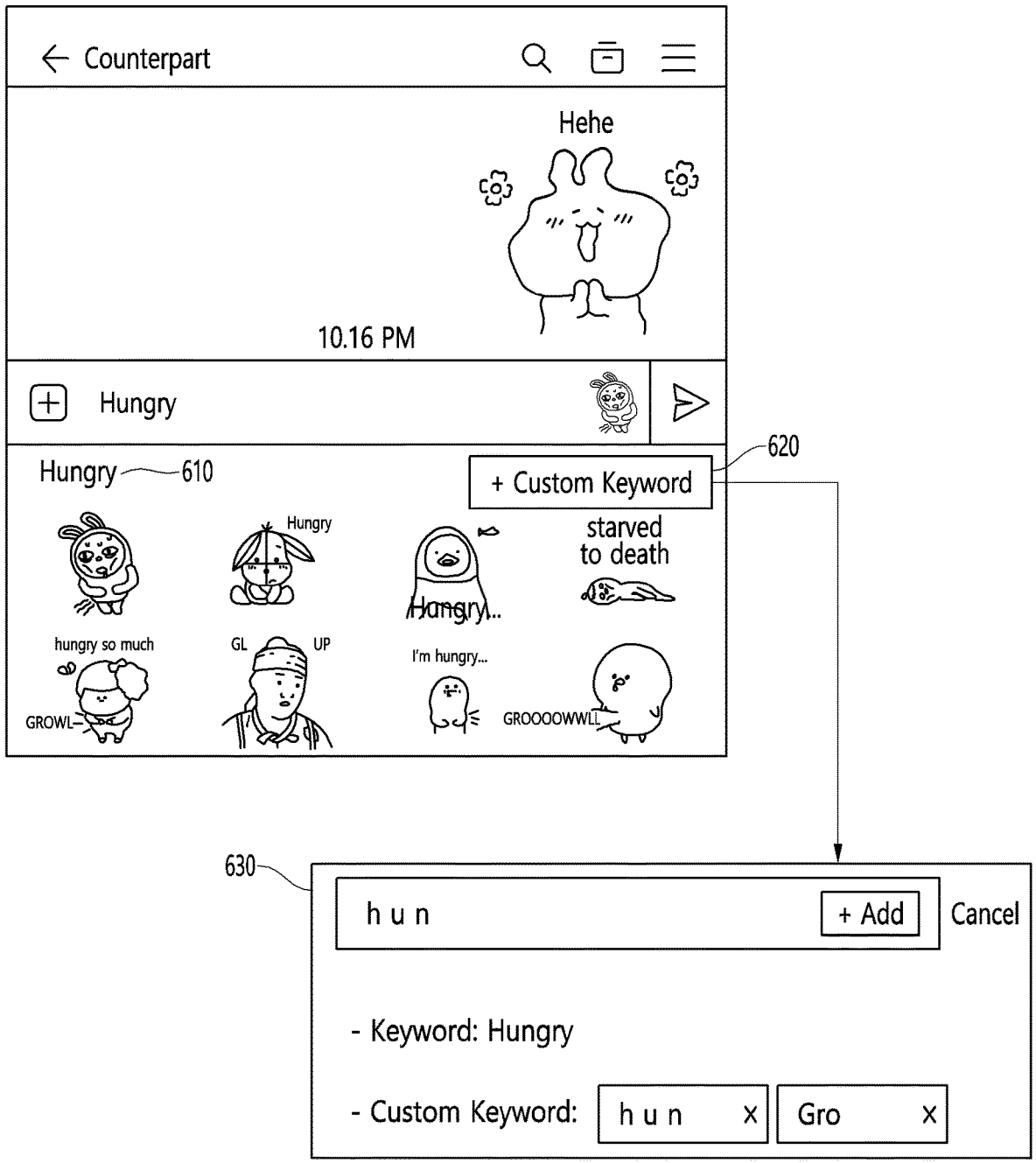
FIG. 6 is a screen illustrating another example in which a user terminal receives matching information in which a custom keyword and metadata are matched.

FIG. 6 is a screen illustrating another example in which the user terminal 10 receives matching information in which a custom keyword and metadata are matched. FIG. 6 shows a case where the matching information shown in FIG. 4 is input.

The user terminal 10 may display metadata 610 before the operation S110 is performed. Referring to FIG. 6, the user terminal 10 displays a screen as a result of performing an emoticon search with a search keyword "hungry". Metadata of the search keyword "hungry" is displayed on the result screen together with search result emoticons. Here, the user terminal 10 may provide an interface 620 for matching a custom keyword to the displayed metadata.

When the user performs an interaction of selecting the interface 620, the user terminal 10 may provide the user with an interface 630 for inputting a custom keyword to be matched with the metadata. Referring to FIG. 6, it can be seen that "hun" and "Gro" are input as custom keywords to be matched with the metadata of "hungry". In some cases, the user terminal 10 may recommend a custom keyword appropriate or probably preferred by the user to the user with reference to the metadata.

Figure 7:
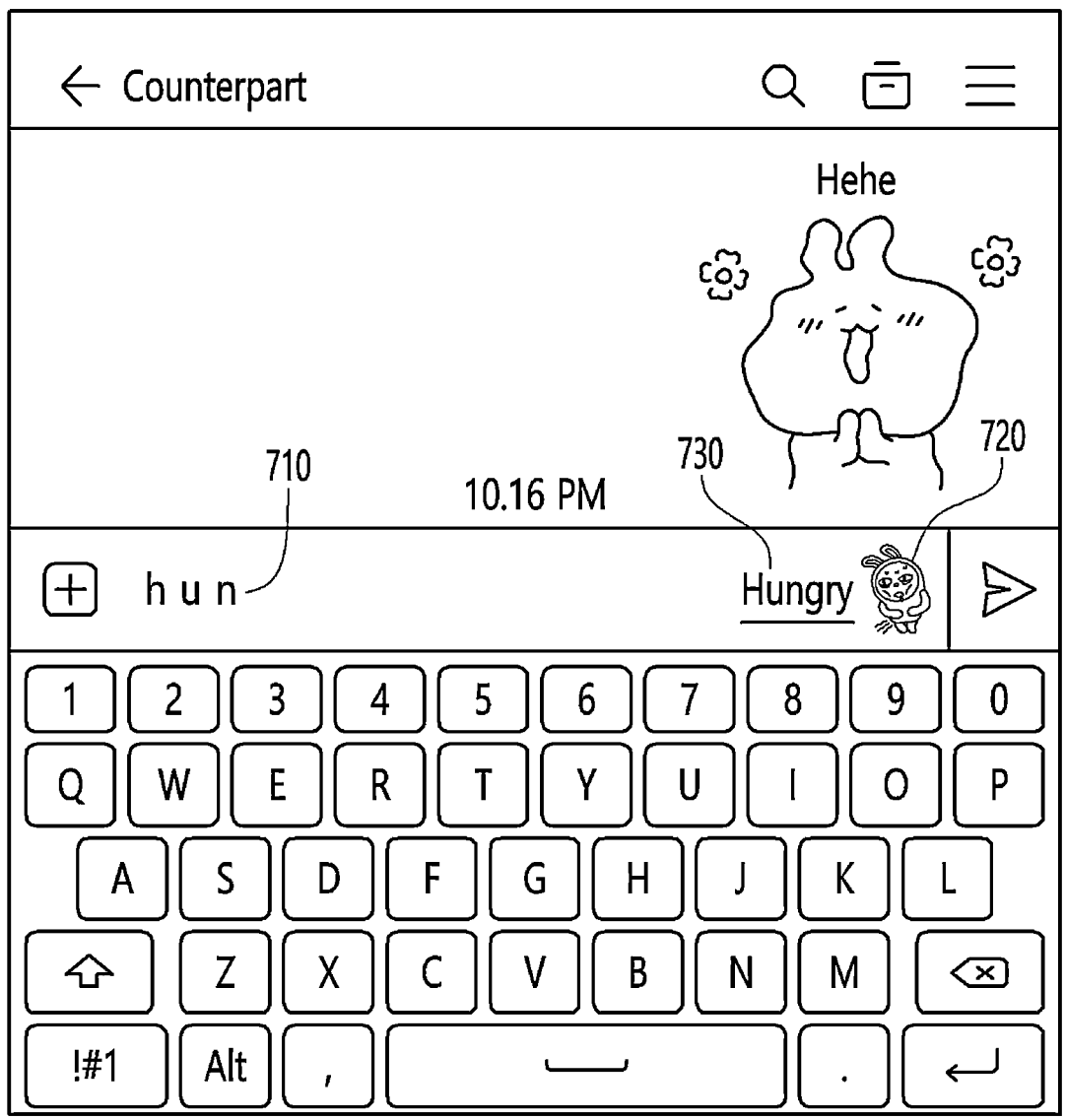
FIG. 7 is a screen illustrating an example in which a user terminal receives an input of a custom keyword.

FIG. 7 is a screen illustrating an example in which the user terminal 10 receives a custom keyword. FIG. 7 illustrates receiving a custom keyword of the matching information shown in FIG. 4.

Referring to FIG. 7, the user terminal 10 receives a custom keyword through a message input window 710 of a chat room. When it is determined that information received through the message input window 710 is a custom keyword, the user terminal 10 may provide the user with an interface 720 for providing an emoticon based on the custom keyword. The interface 720 may be displayed in a part of the message input window 710. The interface 720 may display any one of emoticons to be displayed later in a small size based on the custom keyword. When the user inputs an interaction of selecting the interface 720, the emoticon may be displayed as shown in FIG. 8.

In addition, when it is determined that information received through the message input window is a custom keyword, the user terminal 10 may display metadata 730 matched with the custom keyword. The metadata 730 may be displayed in a part of the message input window 710.

Figure 8:
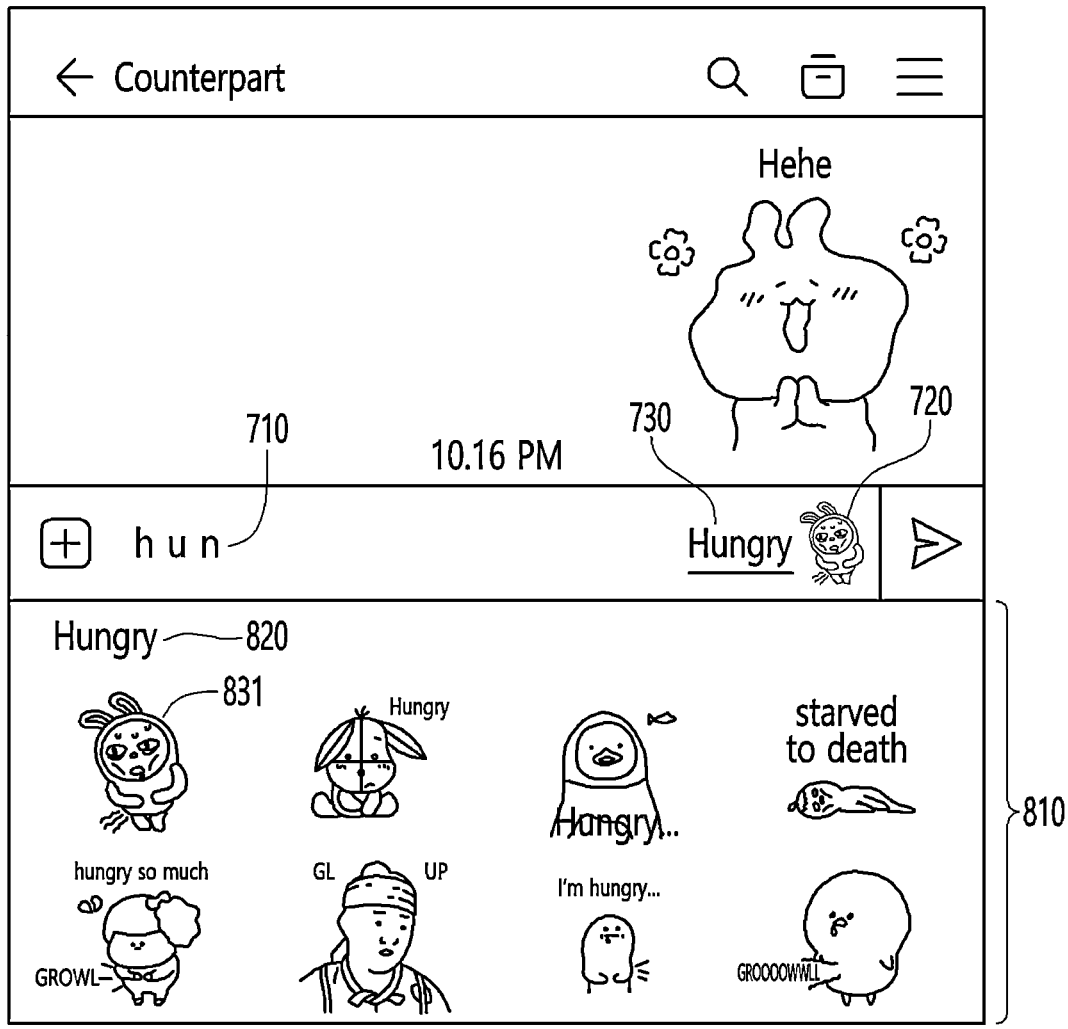
FIG. 8 is a screen illustrating an example in which a user terminal displays an emoticon using a custom keyword.

FIG. 8 is a screen illustrating an example in which the user terminal 10 displays emoticons using a custom keyword. FIG. 8 displays emoticons related to metadata of the matching information shown in FIG. 4.

FIG. 8 illustrates an operation subsequent to FIG. 7. For example, when a user inputs an interaction with respect to the interface 720 provided in FIG. 7, emoticons may be displayed as shown in FIG. 8.

Referring to FIG. 8, the user terminal 10 displays at least one emoticon related to metadata. The metadata is matched with an input custom keyword. As shown in FIG. 8, the emoticon may be displayed in an area 810 in which a keyboard interface for inputting a message in an original chat room is displayed.

In the operation S140, emoticons may be arranged by a predetermined arrangement method. In addition, there may be various methods for arranging emoticons. For example, there may be a method for arranging emoticons in consideration of the user's characteristic information and the user's emoticon use history. Here, considering the user's characteristic information may mean displaying with the highest priority (or at a front position) an emoticon preferred by users having the corresponding characteristic information based on the characteristic information such as the user's age and gender. In FIG. 8, an example of displaying emoticons related to the metadata "hungry" will be described. When the user of the user terminal 10 is a woman in her 30s, and the emoticon most preferred by a woman in her 30s among the emoticons related to the metadata "hungry" is the "hungry" emoticon 831, the emoticon 831 may be displayed most preferentially.

Similarly, considering the user's emoticon use history may mean displaying emoticons corresponding to the user's favorite or recent uses with the highest priority (or at a front position). In FIG. 8, an example of displaying emoticons related to the metadata "hungry" will be described. When the user of the user terminal 10 frequently uses the "hungry" emoticon 831 recently, the emoticon 831 may be displayed with the highest priority.

As another method, there may be a method for arranging emoticons in consideration of classification information of a chat room in which a corresponding recommendation group is displayed. The classification information of the chat room may include various types of information. For example, classification information may be given by classifying the chat room by a casual level. The casual level of the chat room may be information regarding whether an environment of the chat room, a chatting participant, or context of conversation is appropriate to be casual and light or appropriate to be formal and strict Specifically, when it is determined that the chat room is a business chat room based on information such as a title of the chat room, chat participants, conversation context, and emoticons used in the chat room, the casual level of the chat room is set to a low level. In this case, an emoticon having a low casual level may be displayed with the highest priority based on the casual level in meta information of emoticons.

For example, in FIG. 8, when the casual level of the chat room is high, the emoticon 831 having the highest casual level among the emoticons related to the metadata "hungry" may be displayed with the highest priority.

Classification information of the chat room may be determined by various classification criteria in addition to the above-mentioned casual level. For example, it is possible to classify a chat room by topic and display an emoticon suitable for the topic with the highest priority. In addition, it is possible to classify a chat room by a language used (Korean, English, Japanese, etc.), and display an emoticon suitable for the language with the highest priority.

Figure 9:
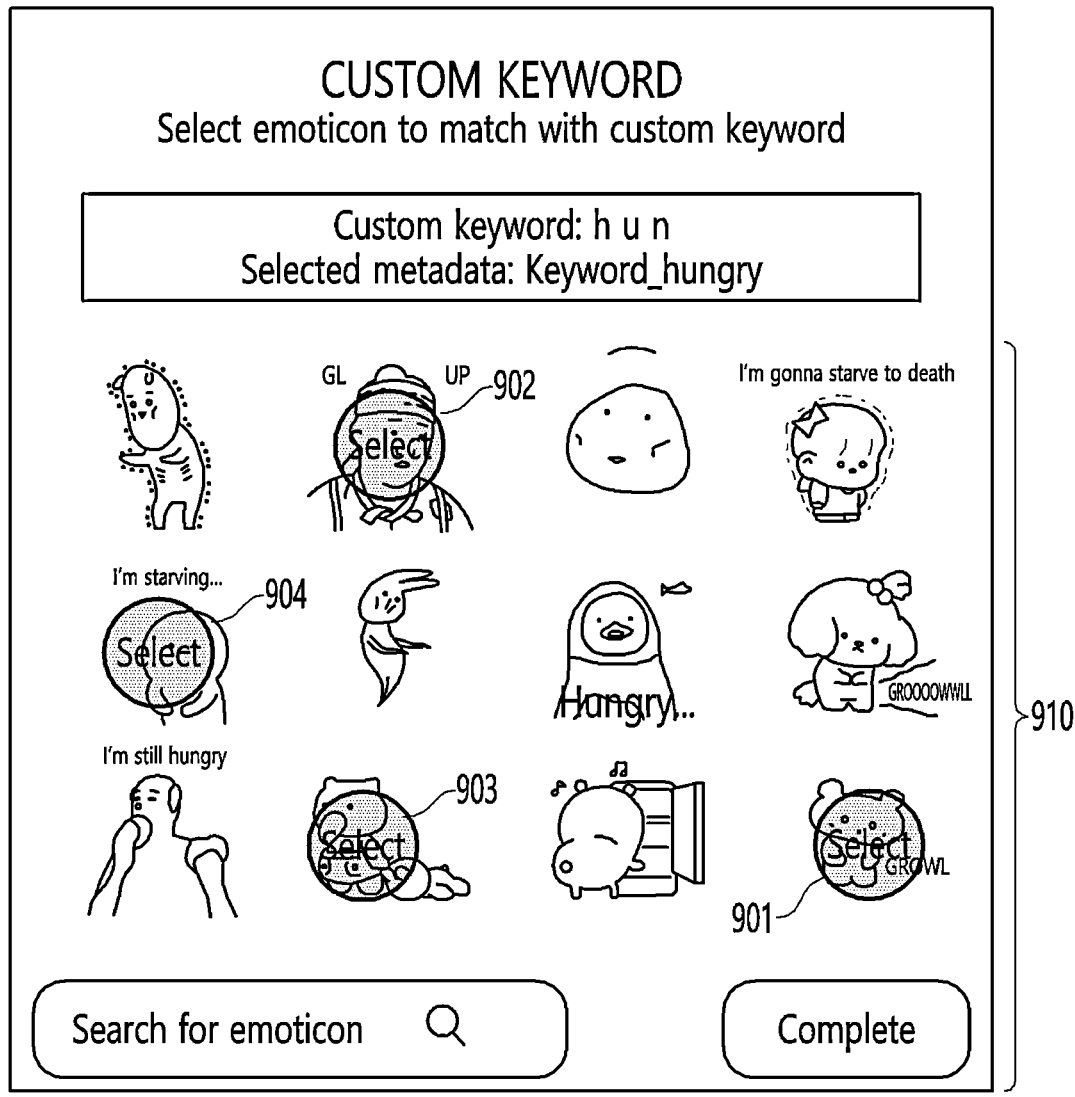
FIG. 9 is a screen illustrating an example in which a user terminal receives information for selecting an emoticon matching a custom keyword by the user terminal.

FIG. 9 is a screen illustrating an example in which the user terminal 10 receives information for selecting an emoticon matching a custom keyword.

The user terminal 10 may display with the highest priority or selectively an emoticon selected by a user from among at least one emoticon related to metadata matched with the custom keyword.

That is, as shown in FIG. 8, when the user inputs a custom keyword of "hun", all emoticons having keyword metadata "hungry", which has been matched in advance, may not be displayed, but instead only an emoticon selected by the user among the emoticons having the keyword metadata "hungry" may be displayed.

FIG. 9 illustrates a screen on which the user's interaction of selecting at least one of emoticons related to metadata matched with a custom keyword is performed. The user may select at least one of at least one displayed emoticon 910. The user terminal 10 may display interfaces 901, 902, 903, and 904 indicating that corresponding emoticons are selected in response to the user's interaction of selecting the emoticons.

Figure 10:
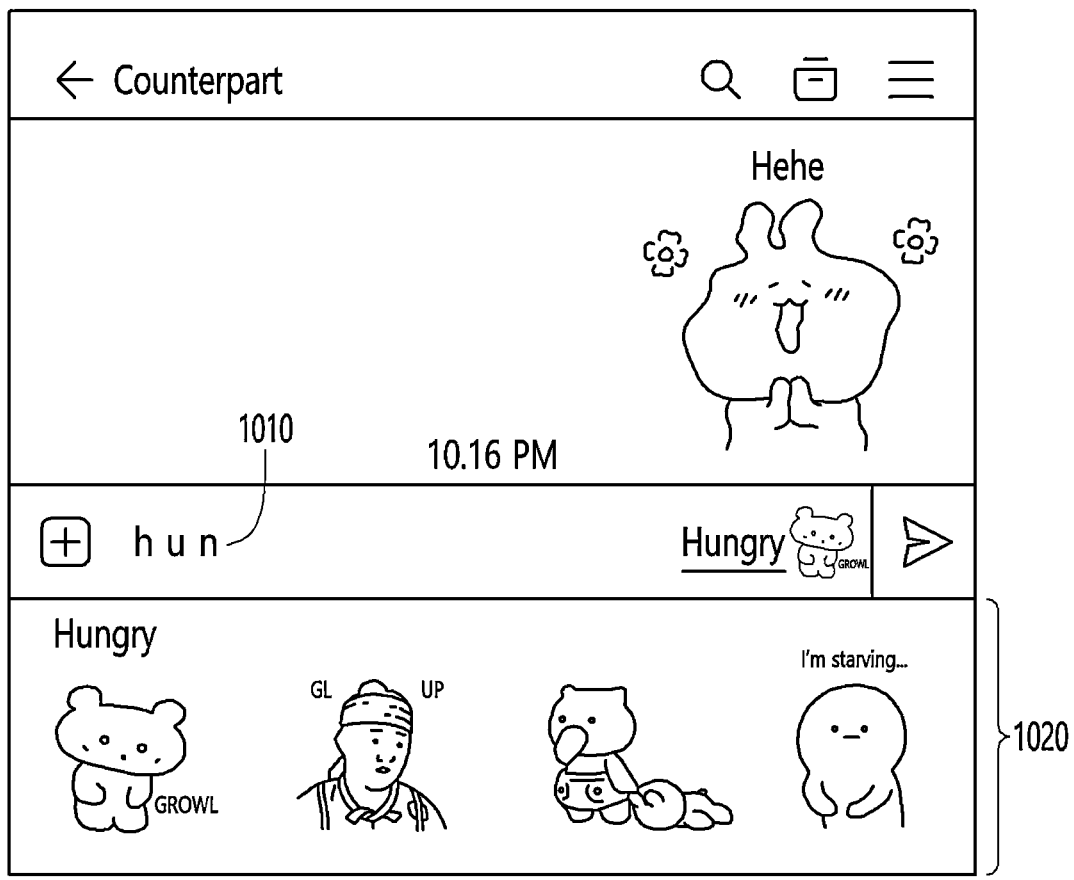
FIG. 10 is a screen illustrating an example in which a user terminal displays an emoticon using a custom keyword.

FIG. 10 is a screen showing an example in which the user terminal displays emoticons using a custom keyword. FIG. 10 shows an operation subsequent to FIG. 9.

Referring to FIG. 10, when a custom keyword 1010 of "hun" is input to the user terminal 10, emoticons 1020 selected by the user from among the emoticons having metadata "hungry" may be displayed. Here, the emoticons may be displayed in various orders. For example, the emoticons may be displayed in an order in which the emoticons are selected. That is, if the user selects the emoticons in the order of reference numerals 901, 902, 903, and 904 on the screen of FIG. 9, the emoticons are displayed in the same order on the screen of FIG. 10.

In FIG. 10, it is illustrated that only the selected emoticons from among the emoticons having the metadata "hungry" are displayed when the custom keyword of "hun" is input.

However, in some cases, it is also possible to display with the highest priority (at a front position) a selected emoticon and display an unselected emoticon next.

Hereinafter, another embodiment of a method in which the user terminal 10 according to the present disclosure displays emoticons using a custom keyword will be described with reference to FIGS. 11 to 15.

For convenience of explanation, in describing an embodiment of the present disclosure with reference to FIGS. 11 to 15, some of the description already provided above with reference to FIGS. 3 to 10 will be omitted.

FIG. 11 is a table illustrating an example of matching information in which a custom keyword and metadata are matched.

Referring to FIG. 11, one custom keyword may be matched with multiple metadata. For example, as shown in FIG. 11, the user may match a custom keyword "hun" with metadata "hungry" and metadata "Let's eat".

Multiple metadata matched with one custom keyword may correspond to the same or different fields. For example, the metadata "hungry" and the metadata "Let's eat" both matched to the custom keyword "hun" may correspond to the keyword field. However, the metadata "JAY-G" matched with the custom keyword "jg" may correspond to the character field, and the metadata "Hip-hop" matched with the custom keyword "jg" may correspond to the keyword field. At a time when metadata to be matched with a custom keyword is input, a field thereof may be designated and stored.

Multiple metadata matched with one custom keyword may have an operation relationship with each other. For example, the metadata of the character field "JAY-G" and the metadata of the keyword field "Hip-hop", both matched with the custom keyword "jg", may be connected in an AND (intersection) operation relationship. In this case, based on the custom keyword "jg", an emoticon having the metadata of the keyword field "Hip-hop" and the metadata of the character field "JAY-G" may be displayed.

When it comes to operation relationships, various operators such as OR (union) and NOT (exclusion) may be used in addition to the above-described AND (intersection).

The user may create a desired combination of metadata by using multiple metadata and operators, and match the combination to a specific custom keyword.

Figure 12:
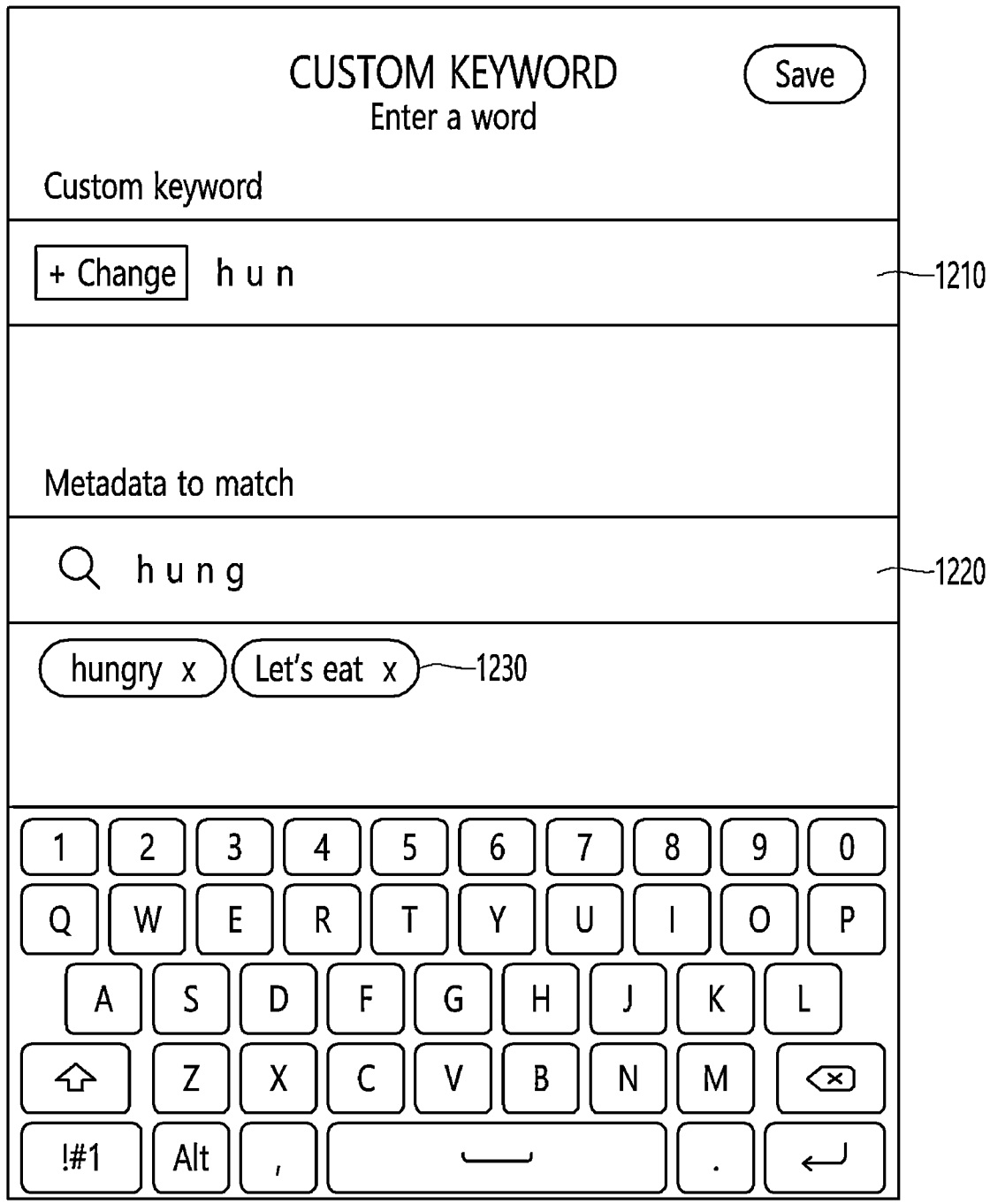
FIG. 12 is a screen illustrating an example in which a user terminal receives matching information in which a custom keyword and metadata are matched.

FIG. 12 is a screen illustrating an example in which the user terminal 10 receives matching information in which a custom keyword and metadata are matched. FIG. 12 shows that the matching information shown in FIG. 11 is input.

Before the operation S110 is performed, the user terminal 10 may provide the user with an input window interface 1210 for inputting a custom keyword and an input window interface 1220 for inputting matching metadata. The user may enter a custom keyword and metadata through the provided interfaces.

When multiple metadata is matched with the custom keyword, the multiple metadata 1230 may be sequentially arranged and displayed. The user terminal 10 may provide an interface for selecting and deleting some of the multiple metadata displayed.

Although not shown in FIG. 12, it is also possible to display fields and contents of the metadata together in some cases. When the fields and contents are displayed together in the metadata of FIG. 12, metadata "hungry" may be displayed as "keyword: hungry".

Figure 13:
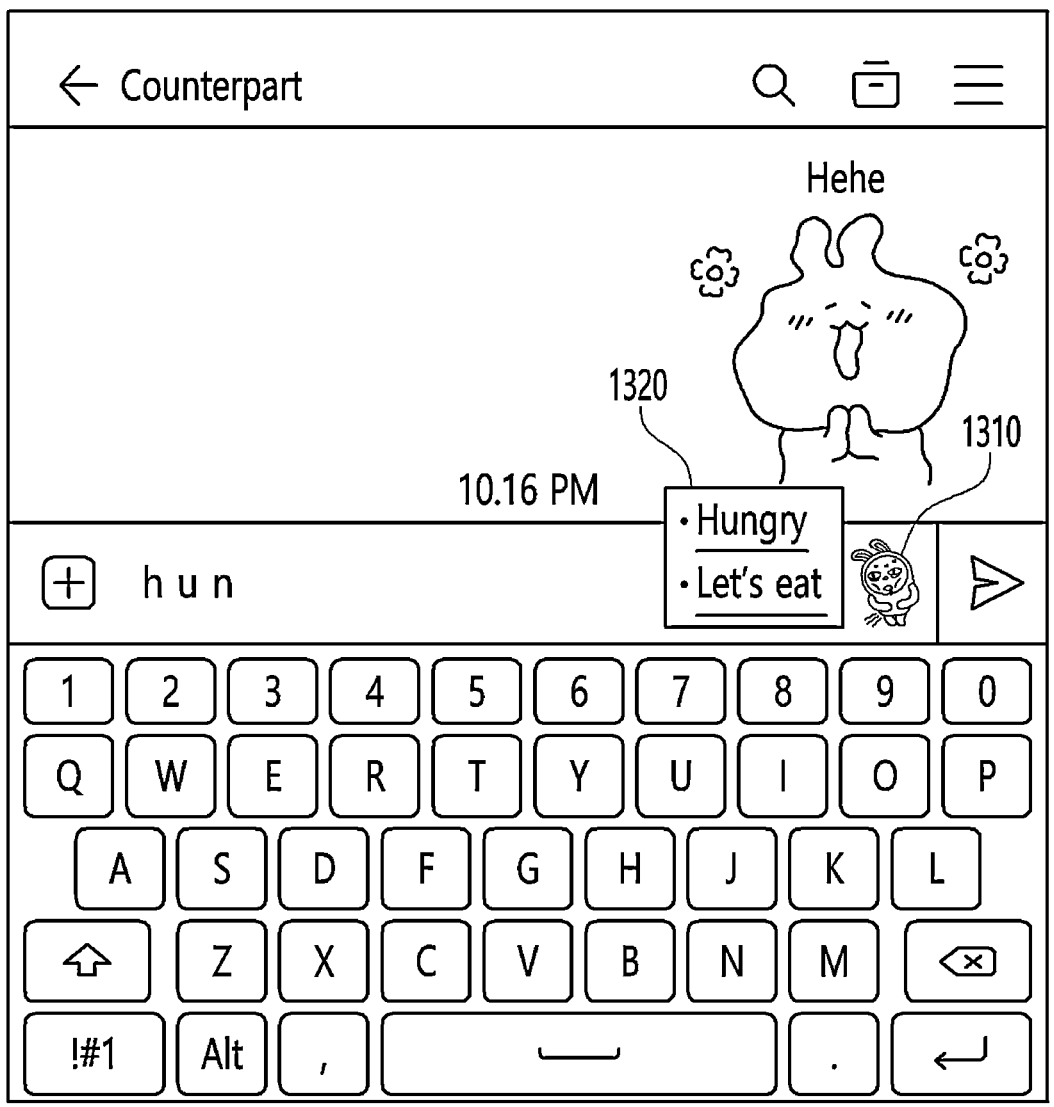
FIG. 13 is a screen illustrating an example in which a user terminal receives an input of a custom keyword.

FIG. 13 is a screen illustrating an example in which the user terminal 10 receives a custom keyword. FIG. 13 illustrates an example of receiving a custom keyword of the matching information shown in FIG. 11.

Referring to FIG. 13, the user terminal 10 receives a custom keyword through a message input window of a chat room. When it is determined that information received through a message input window is a custom keyword, the user terminal 10 may provide the user with an interface 1310 for providing an emoticon based on the custom keyword.

In addition, when it is determined that information received through the message input window is a custom keyword, the user terminal 10 may display metadata 1320 matched with the custom keyword. At least one metadata matched with the custom keyword may be displayed as the metadata 1320. Such items of metadata may be provided with a selection interface through which the user is able to make a selection by an interaction. The user may select at least a piece of the at least one metadata 1320 to receive an emoticon related to desired metadata.

Figure 14:
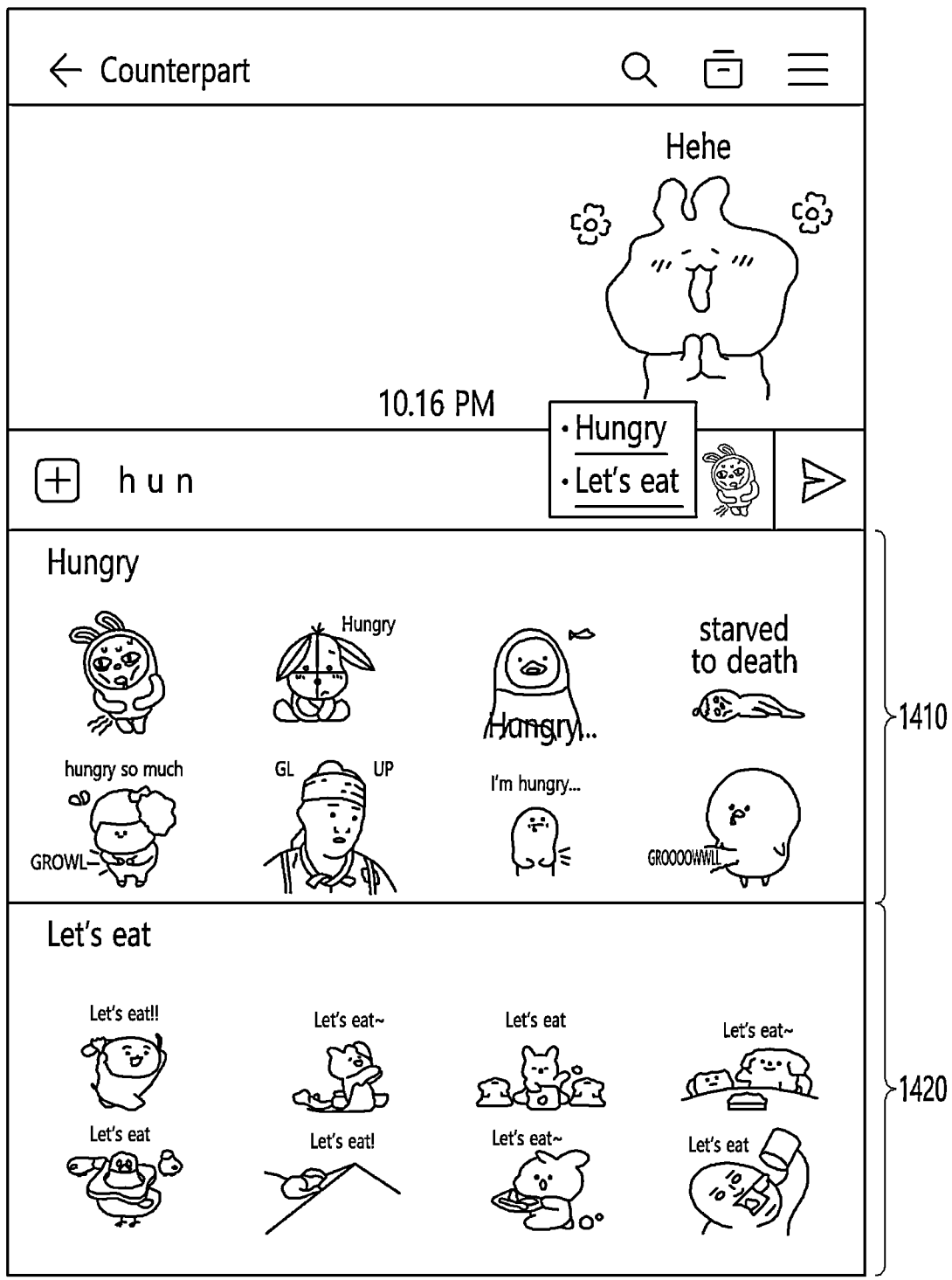
FIG. 14 is a screen illustrating an example in which a user terminal displays emoticons using a custom keyword.

FIG. 14 is a screen illustrating an example in which the user terminal 10 displays emoticons using a custom keyword. FIG. 14 is a display of emoticons related to metadata of matching information shown in FIG. 11.

FIG. 14 shows an operation subsequent to FIG. 13. For example, when the user inputs an interaction of selecting all items of the at least one metadata 1320 provided in FIG. 13, emoticons may be displayed as shown in FIG. 14. When the user inputs an interaction of selecting some items from a provided list 1320, only emoticons related to the selected metadata may be displayed similarly to the example of FIG. 8.

Referring to FIG. 14, the user terminal 10 may categorize and display emoticons in groups by related metadata. For example, as shown in FIG. 14, emoticons related to metadata "hungry" may be displayed in a first group 1410, and emoticons related to metadata "Let's eat" may be displayed in a second group 1420.

When the emoticons are categorized and displayed in a plurality of groups in the operation S140, the arrangement of the respective groups may be determined in consideration of various conditions. For example, the arrangement of the respective groups may be determined in consideration of the user's characteristic information, the user's emoticon use history, the context of chat room conversation, classification information of the chat room, and the like.

Figure 15:
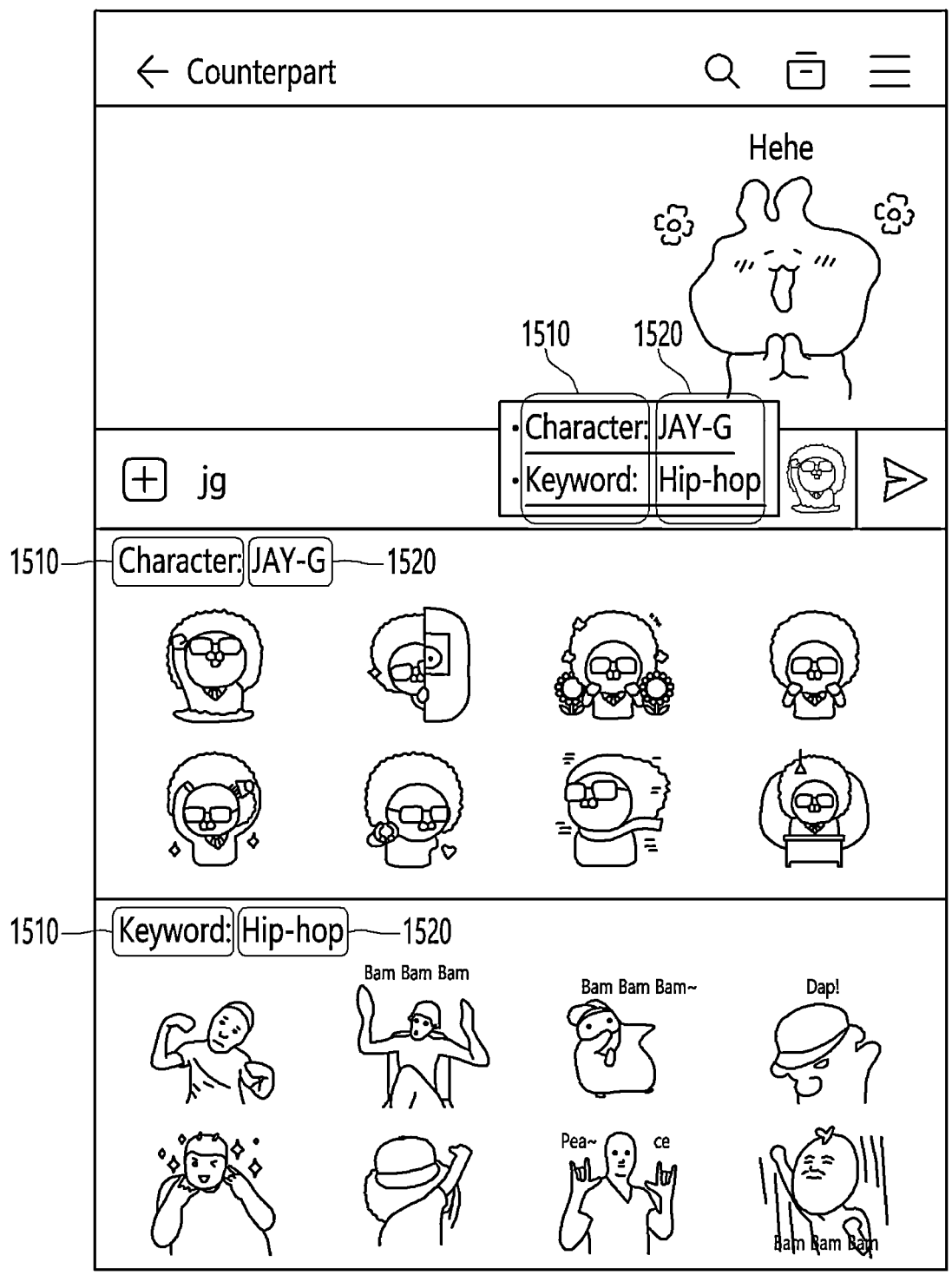
FIG. 15 is a screen illustrating an example in which a user terminal displays emoticons using a custom keyword.

FIG. 15 is a screen illustrating an example of the user terminal 10 displays emoticons using a custom keyword. FIG. 15 displays emoticons related to metadata of matching information shown in FIG. 11.

Referring to FIG. 15, a field 1510 and contents 1520 may be displayed together while metadata matched with a custom keyword is displayed. The displaying of the field 1510 and the content 1520 of metadata together may apply not only to how to display a list of metadata but also to how to display emoticons. In doing so, the user may be able to easily identify a field which metadata corresponds to.

Hereinafter, another embodiment of a method in which the user terminal 10 according to the present disclosure displays emoticons using a custom keyword will be described with reference to FIGS. 16 to 17.

Figure 17:
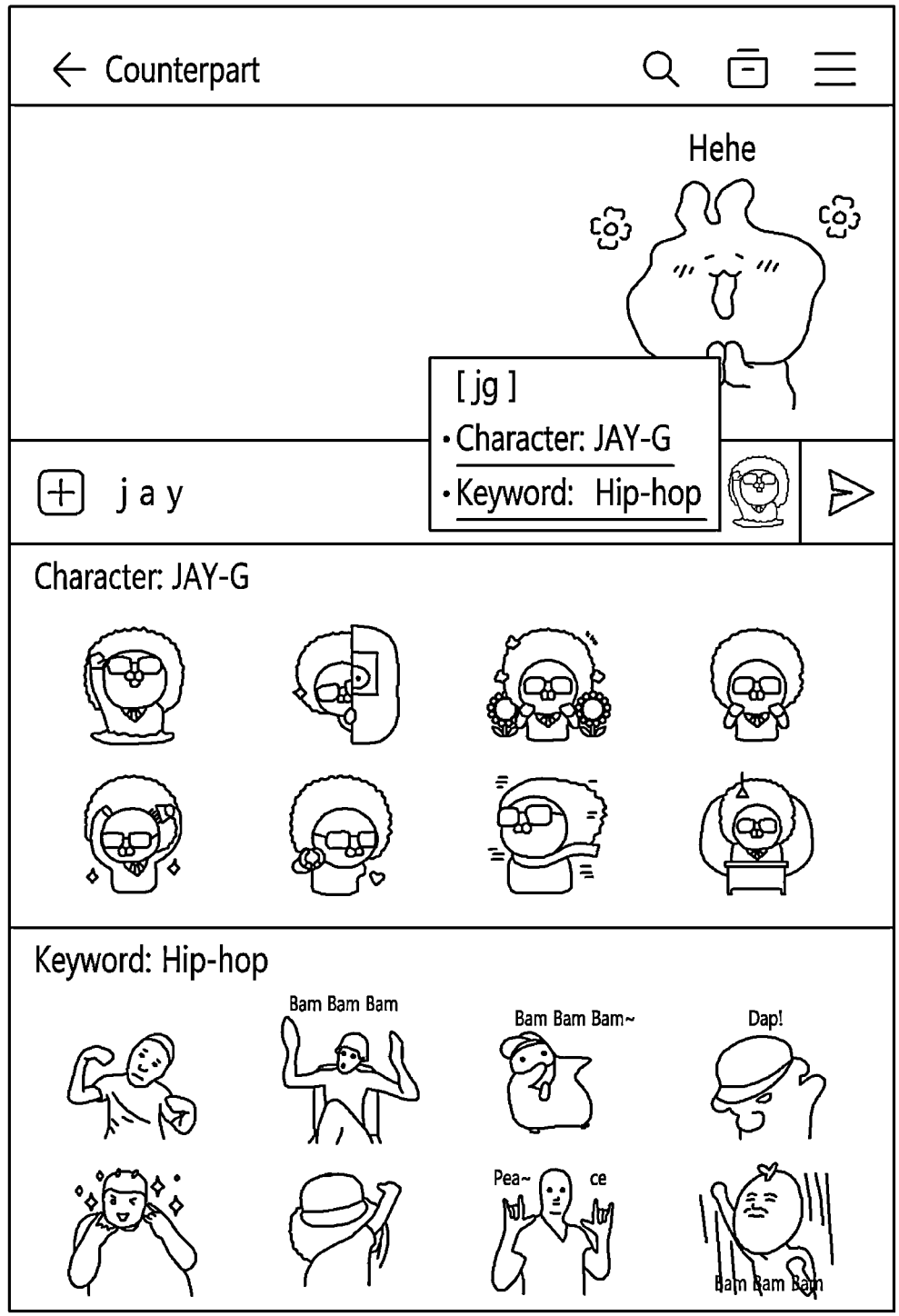
FIG. 17 is a screen illustrating an example in which a user terminal displays emoticons using an additional custom keyword.

For convenience of description, in describing an embodiment of the present disclosure with reference to FIGS. 16 to 17, some of the description already provided above with reference to FIGS. 3 to 15 will be omitted.

FIG. 16 is a table illustrating an example of matching information in which a custom keyword and metadata are matched.

Referring to FIG. 16, there may be an additional custom keyword to be matched with a custom keyword. The additional custom keyword may be matched with a different custom keyword. As shown in FIG. 16, an additional custom keyword "jay" may be matched with an existing custom keyword "jg".

FIG. 17 is a screen illustrating an example in which the user terminal 10 displays emoticons using an additional custom keyword. FIG. 17 shows emoticons related to metadata of matching information shown in FIG. 16.

Referring to FIG. 17, when an additional custom keyword is input, a custom keyword and metadata matched therewith may be displayed together. As shown in FIG. 17, when an additional custom keyword "jay" is input, the existing custom keyword "jg" and matching metadata may be displayed together.

Hereinafter, another embodiment of a method in which the user terminal 10 according to the present disclosure displays emoticons using a custom keyword will be described with reference to FIG. 18.

Figure 18:
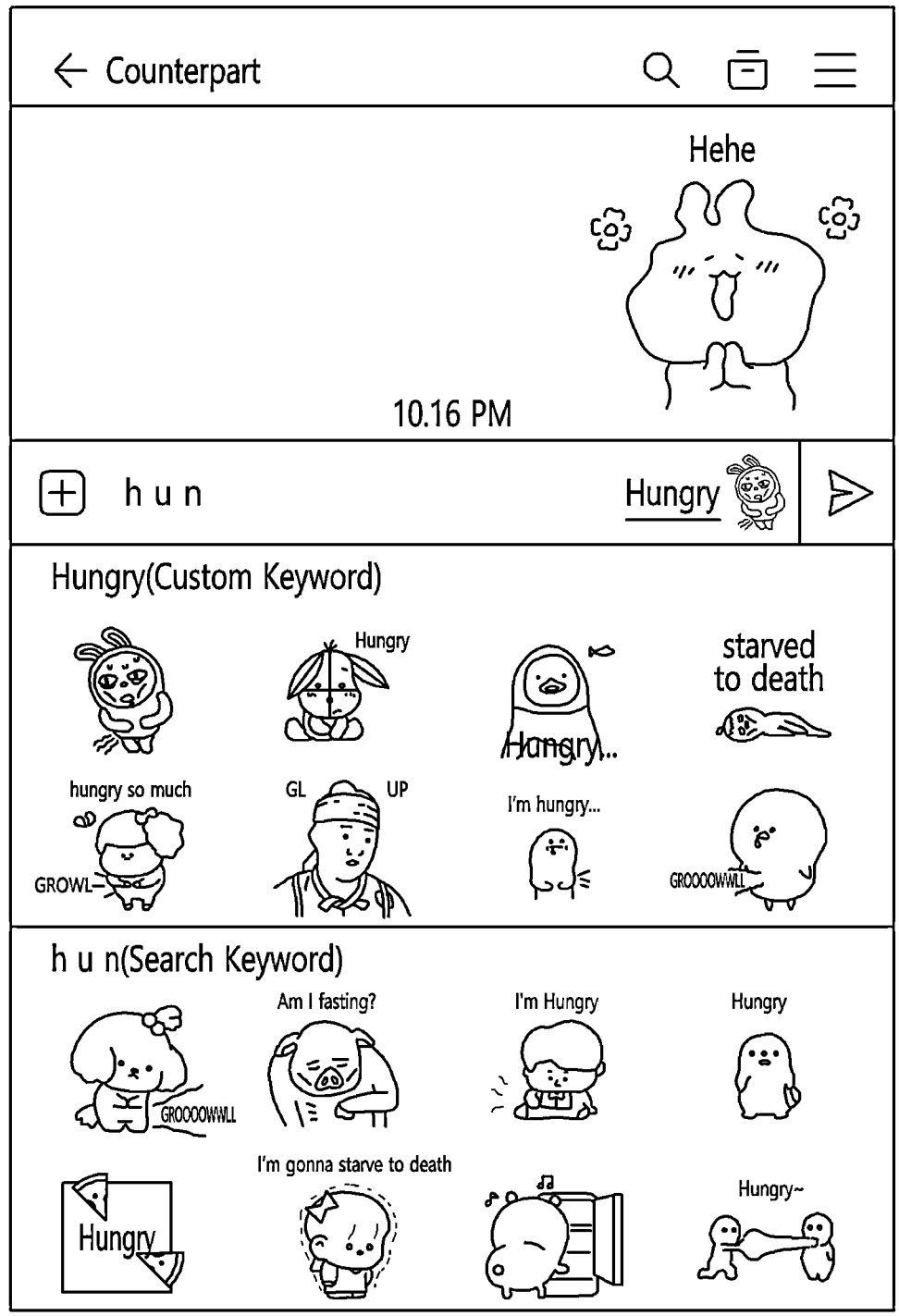
FIG. 18 is a screen illustrating an example in which a user terminal displays emoticons using a custom keyword.

For convenience of description, in describing an embodiment of the present disclosure with reference to FIG. 18, some of the description already provided above with reference to FIGS. 3 to 15 will be omitted.

FIG. 18 is a screen showing an example in which the user terminal 10 displays emoticons using a custom keyword.

A custom keyword set by the user may be identical to a pre-registered search keyword used to search for an emoticon in some cases. As shown in FIG. 18, a keyword "hun" may be a search keyword as well as a custom keyword set by the user. In addition, metadata "hungry" may be matched with the custom keyword "hun".

When such a custom keyword is input, the user terminal 10 may display emoticons based on the custom keyword in the operation S140 and may also display an emoticon result, which is found using the custom keyword, as a search keyword.

In some cases, although not shown in the drawings, when such a custom keyword is input, the user terminal 10 may provide the user with an interface for selecting whether to display emoticons based on the custom keyword or to display emoticons based on the search keyword. The user terminal 10 may display emoticons based on a result of the user's interaction with respect to the interface.

Hereinafter, a method in which the server 20 of the present disclosure provides emoticons using a custom keyword will be described with reference to FIG. 19.

In the embodiment described with reference to FIG. 19, it is assumed that the user terminal 10 does not store matching information in the user terminal 10 in the operation S120, but transmits the matching information to the server 20.

Figure 19:
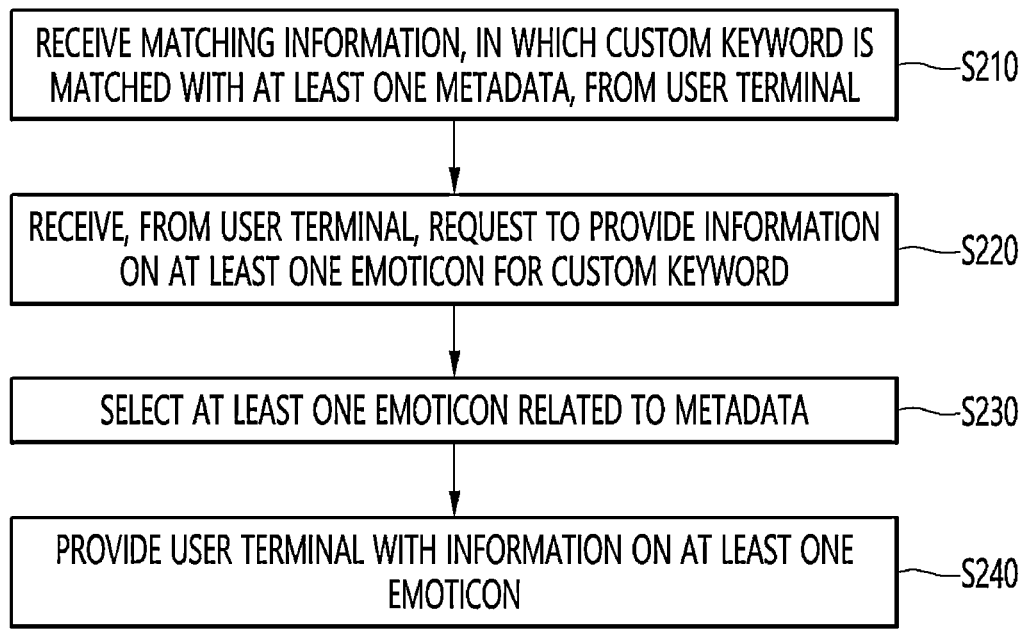
FIG. 19 is a flowchart of an embodiment of a method in which a server displays emoticons using a custom keyword.

FIG. 19 is a flowchart of an embodiment of a method in which the server 20 displays emoticons using a custom keyword.

In operation S210, the server 20 receives matching information in which a custom keyword and at least one metadata are matched from the user terminal 10. The server 20 may store the received matching information in a separate database.

In operation S220, the server 20 receives a request from the user terminal 10 to provide information on at least one emoticon for a custom keyword. This may be a response when the user terminal 10 receives the corresponding custom keyword or a request for display of an emoticon based on the custom keyword from the user.

In operation S230, the server 20 may select at least one emoticon related to the metadata. To this end, the server 20 may first input a custom keyword into a database, in which matching information is stored, to read metadata matched with the custom keyword. Thereafter, the server 20 may select an emoticon related to the metadata based on the read metadata.

In operation S240, the server 20 may provide information on at least one selected emoticon to the user terminal 10. Specifically, the server 20 may provide at least one of an identifier, an image, a thumbnail, and graphic information of an emoticon to the user terminal 10 in the operation S240.

Through the present disclosure as described above, the user terminal 10 may allow the user to find and use an emoticon by using a custom keyword set by himself or herself. In particular, by setting the custom keyword to be simpler or shorter than an existing search keyword, the user may be able to search for and find the emoticon more quickly. In addition, by matching multiple metadata to a single custom keyword, the user may be able to create his or her own combination of emoticons for a single keyword.

The present disclosure may be a computer program stored in a medium to execute the above-described methods in combination with hardware.

The present disclosure includes a memory and a processor coupled to the memory and configured to execute instructions included in the memory, wherein the processor receives matching information in which a custom keyword and at least one metadata are matched from a user terminal; The metadata is information on the properties of the emoticon—receiving a request from the user terminal to provide information on at least one emoticon for the custom keyword, selecting at least one emoticon related to the metadata, and the user and a server providing an emoticon using a custom keyword that provides information on the at least one emoticon to the terminal.

Technical features disclosed in each embodiment of the present disclosure are not limited only to a corresponding embodiment, and all the technical features disclosed in embodiments may be combined and applied to different embodiments unless the technical features are incompatible with each other.

Thus, although each embodiment has been described mainly about technical features thereof, but all the technical features may be combined and applied unless the technical features are incompatible with each other.

Although exemplary embodiments of the present disclosure have been described above, it may be understood by those skilled in the art that various changes or modifications may be made thereto without departing from the essential features of the present disclosure. The scope of the present disclosure should be construed by the following claims, and all the technical scope belonging to the equivalents of the present disclosure should be interpreted to belong to the scope of the present disclosure.

What is claimed is:

1. A method for providing emoticons using a custom keyword, in an electronic device, the method comprising:
   receiving, by a user terminal, a user input related to matching information in which the custom keyword is matched with at least one metadata, wherein the at least one metadata includes information on attributes of at least one emoticon;
   storing, by the user terminal, the matching information or transmitting the matching information to a server;
   receiving, by the user terminal, an input of the custom keyword via a message input window;
   analyzing a priority information of the at least one metadata corresponding to the received custom keyword to determine a priority of the at least one emoticon related to the at least one metadata;
   automatically changing an arrangement of the at least one emoticon to a position of a predetermined priority based on a result of the analyzation of the priority information of the at least one metadata; and
   displaying, by the user terminal, the automatically changed arrangement of the at least one emoticon related to the at least one metadata,
   wherein the receiving of the user input related to the matching information comprises:
   receiving, by the user terminal, a user input for the at least one metadata via the message input window,
   displaying, by the user terminal, the message input window and an interface element via a search result screen with the at least one emoticon related to the at least one metadata,
   receiving, by the user terminal, a user interaction selecting the interface element via the search result screen,
   providing a supplemental input window based on the user interaction selecting the interface element, wherein the supplemental input window displays the at least one metadata and an input of the custom keyword, and
   receiving, by the user terminal, a user input for the custom keyword, via the supplemental input window, to match the at least one metadata.

2. The method of claim 1, wherein:
   the at least one metadata is a plurality of metadata, and
   in the displaying of the at least one emoticon, the user terminal categorizes and displays the at least one emoticon into groups by related metadata.

3. The method of claim 1, wherein the receiving of the user input related to the matching information further comprises:
   receiving the custom keyword by the user terminal;
   automatically displaying, by the user terminal, the at least one metadata matched with the received custom keyword; and
   receiving, by the user terminal, an interaction of a user selection of at least a piece of the at least one metadata.

4. The method of claim 3, wherein in the displaying the at least one emoticon, the user terminal displays with a highest priority or selectively the at least one emoticon related to the at least one metadata selected by the interaction.

5. The method of claim 3, wherein:
   the at least one metadata is a plurality of metadata;
   each metadata of the plurality of metadata is designated with a field indicating information regarding which attribute among a plurality of attributes to which the at least one emoticon relates; and
   in the displaying of the at least one metadata, the user terminal displays the field together with the at least one metadata.

6. The method of claim 1, wherein:
   the at least one metadata is multiple metadata;
   each metadata of the multiple metadata is designated with a field indicating information regarding which attribute among a plurality of attributes the at least one emoticon relates to; and
   at least a piece of the multiple metadata is metadata designated with different fields.

7. The method of claim 1, wherein the at least one metadata indicates whether the at least one emoticon is an emoticon classified as the user's favorite or an emoticon classified as being recently used.

8. The method of claim 1, wherein when the custom keyword is identical to a pre-registered search keyword used to search for the at least one emoticon, the user terminal displays a search result, which is found using the custom keyword, as a search keyword in the displaying of the at least one emoticon.

9. The method of claim 1, when the custom keyword is identical to a pre-registered search keyword used to search for emoticons, further comprising:
displaying, together with the at least one emoticon, a search result, which is found using the custom keyword, as a search keyword.

10. The method of claim 1, further comprising:
receiving, by the user terminal, additional matching information in which an additional custom keyword is matched with the custom keyword; and
storing the additional matching information or transmitting the additional matching information to a server by the user terminal.

11. The method of claim 1, further comprising:
receiving, by the user terminal, an interaction of selecting a part of the at least one emoticon related to the at least one metadata,
wherein in the displaying of the at least one emoticon, the user terminal displays with a highest priority or selectively the at least one emoticon selected by the received interaction.

12. The method of claim 1, wherein in the displaying of the at least one emoticon, the user terminal displays the at least one emoticon related to the at least one metadata in an order determined in consideration of the user's emoticon use history or emoticon preference information.

13. The method of claim 1 further comprising:
analyzing a priority information of multiple metadata corresponding to the received custom keyword to determine priorities of multiple emoticons related to the multiple metadata;
automatically arranging the multiple emoticons to positions of predetermined priorities based on a result of the analyzation of the priority information of the multiple metadata; and
automatically displaying, by the user terminal, the automatic arrangement of the multiple emoticons related to the multiple metadata.

14. The method of claim 1, wherein the at least one metadata is designated with at least one field indicating information regarding which attribute among a plurality of attributes the at least one emoticon relates, and the at least one field includes the priority information of the at least one metadata.

15. The method of claim 1, wherein the priority information of the at least one metadata includes at least one of a user's characteristic information, a user's emoticon use history, a user's emoticon preference information or a classification information of a chat room.

16. The method of claim 1, wherein the at least one metadata is designated with at least one field factor, and the at least one field factor includes a keyword, an emotion, a character, a preferred age group, a preferred gender group, a degree of casualness, a favorite and an indication of whether the at least one emoticon has been used within a predetermined time.

17. A user terminal comprising:
a memory;
a processor connected to the memory and configured to execute instructions stored in the memory;
an input part configured to receive information under control of the processor;
an output part configured to output information under control of the processor; and
a communication part configured to transmit information under control of the processor, wherein the processor is further configured to:
receive, via the input part, matching information in which a custom keyword and at least one metadata are input through the input part, wherein the at least one metadata is includes information on attributes of at least one emoticon;
store the matching information in the memory or transmit the matching information to a server through the communication part;
receive the custom keyword input through the input part;
analyze a priority information of the at least one metadata corresponding to the received custom keyword to determine a priority of the at least one emoticon related to the at least one metadata;
automatically change an arrangement of the at least one emoticon to a position of a predetermined priority based on a result of the analyzation of the priority information of the at least one metadata; and
display the automatically changed arrangement of the at least one emoticon related to the at least one metadata,
wherein when the matching information is received, the processor is further configured to:
receive a user input for the at least one metadata via the message input window,
displaying, by the user terminal, the message input window and an interface element via a search result screen with the at least one emoticon related to the at least one metadata,
receiving, by the user terminal, a user interaction selecting the interface element via the search result screen,
providing a supplemental input window based on the user interaction selecting the interface element, wherein the supplemental input window displays the at least one metadata and an input of the custom keyword, and
receive a user input for the custom keyword, via the supplemental input window, to match the at least one metadata.

18. A method for providing emoticons using a custom keyword, the method comprising:
receiving, by a server, matching information in which the custom keyword and at least one metadata are matched from a user terminal, wherein the at least one metadata includes information on attributes of at least one emoticon;
receiving, by the server, a request from the user terminal to provide information on the at least one emoticon for the custom keyword;
automatically selecting, by the server, the at least one emoticon related to the at least one metadata;
analyzing a priority information of the at least one metadata corresponding to the custom keyword to determine a priority of the at least one emoticon related to the at least one metadata;
automatically changing an arrangement of the at least one emoticon to a position of a predetermined priority based on a result of the analyzation of the priority information of the at least one metadata; and
providing, by the server, information on the at least one emoticon to the user terminal, wherein the receiving of the user input related to the matching information comprises:

providing, by the user terminal, the message input window and an interface element via a search result screen with the at least one emoticon related to the at least one metadata, receiving, by the user terminal, a user interaction selecting the interface element via the search result screen, providing, by the user terminal, a supplemental input window based on the user interaction selecting the interface element, wherein the supplemental input window displays the at least one metadata and an input of the custom keyword, and receiving, by the server, an interaction of inputting the at least one metadata and the custom keyword to be matched with each other from the user terminal, wherein the at least one metadata and the custom keyword are directly inserted, respectively, via the message input window and the supplemental input window of the user terminal.

\* \* \* \* \*